(12) United States Patent
Benkreira et al.

(10) Patent No.: US 12,147,912 B2
(45) Date of Patent: Nov. 19, 2024

(54) PREDICTING A TIME OF AN EVENT ASSOCIATED WITH AN INSTRUMENT USING A MACHINE LEARNING MODEL

(71) Applicant: Capital One Services, LLC, McLean, VA (US)

(72) Inventors: Abdelkader M'hamed Benkreira, Brooklyn, NY (US); Joshua Edwards, Philadelphia, PA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 515 days.

(21) Appl. No.: 17/445,253

(22) Filed: Aug. 17, 2021

(65) Prior Publication Data
US 2023/0057762 A1    Feb. 23, 2023

(51) Int. Cl.
| | |
|---|---|
| *G06Q 30/02* | (2023.01) |
| *G06N 5/04* | (2023.01) |
| *G06N 20/00* | (2019.01) |
| *G06Q 20/40* | (2012.01) |
| *G06Q 30/0201* | (2023.01) |
| *G06Q 40/02* | (2023.01) |
| *G06Q 20/04* | (2012.01) |

(52) U.S. Cl.
CPC .............. *G06N 5/04* (2013.01); *G06N 20/00* (2019.01); *G06Q 20/4037* (2013.01); *G06Q 30/0201* (2013.01); *G06Q 40/02* (2013.01); *G06Q 20/0425* (2013.01)

(58) Field of Classification Search
CPC . G06Q 20/4037; G06Q 30/0201; G06Q 40/02
See application file for complete search history.

(56) References Cited

U.S. PATENT DOCUMENTS

| | | | |
|---|---|---|---|
| 7,930,248 B1 | 4/2011 | Lawson et al. | |
| 2007/0262137 A1* | 11/2007 | Brown .................. | G06Q 20/40 235/379 |
| 2010/0280859 A1* | 11/2010 | Frederick, II ......... | G06Q 40/00 382/137 |
| 2010/0312715 A1* | 12/2010 | Esque ................... | G06Q 10/08 705/330 |
| 2015/0019416 A1* | 1/2015 | Lawson ............... | G06Q 20/102 705/40 |
| 2021/0248609 A1* | 8/2021 | Singh .................... | G06Q 40/02 |

OTHER PUBLICATIONS

"A Short-Term Disbursement Forecasting Model" (Maier, Steven F., et al. Financial Management, vol. 10, No. 1, 1981, pp. 9-20. JSTOR, https://doi.org/10.2307/3665108) (Year: 1981).*

* cited by examiner

*Primary Examiner* — James M Detweiler
(74) *Attorney, Agent, or Firm* — Harrity & Harrity, LLP

(57) ABSTRACT

In some implementations, a device may receive information indicating that an instrument has been provided by a user to a recipient. The instrument may be associated with a value, and the instrument may be designated for the recipient. The device may determine, using the machine learning model, a prediction of a time of an event associated with the instrument based on the recipient. The event associated with the instrument may result in a reduction of a balance of an account of the user. The device may transmit to another device of the user, a notification indicating the prediction of the time of the event associated with the instrument.

20 Claims, 8 Drawing Sheets

PREDICTING A TIME OF AN EVENT ASSOCIATED WITH AN INSTRUMENT USING A MACHINE LEARNING MODEL

BACKGROUND

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

SUMMARY

Some implementations described herein relate to a system for predicting a time of an event associated with an instrument using a machine learning model. The system may include one or more memories and one or more processors communicatively coupled to the one or more memories. The one or more processors may be configured to receive information indicating that the instrument has been provided by a user to a recipient. The one or more processors may be configured to identify one or more characteristics associated with the recipient. The one or more processors may be configured to determine, using the machine learning model, a prediction of the time of the event associated with the instrument based on the one or more characteristics associated with the recipient. The one or more processors may be configured to determine, based on the prediction of the time and the value, whether a balance of an account of the user will reach a threshold as a result of the event associated with the instrument. The one or more processors may be configured to transmit, to a device of the user, a notification based on a determination that the balance will reach the threshold as the result of the event associated with the instrument.

Some implementations described herein relate to a method of predicting a time of an event associated with an instrument using a machine learning model. The method may include receiving, by a device, information indicating that the instrument has been provided by a user to a recipient, where the instrument is associated with a value, and where the instrument is designated for the recipient. The method may include determining, by the device, using the machine learning model, a prediction of the time of the event associated with the instrument based on the recipient, where the event associated with the instrument will result in a reduction of a balance of an account of the user. The method may include transmitting, by the device, to another device of the user, a notification indicating the prediction of the time of the event associated with the instrument.

Some implementations described herein relate to a non-transitory computer-readable medium that stores a set of instructions for predicting a time of an event associated with an instrument for a device. The set of instructions, when executed by one or more processors of the device, may cause the device to receive information indicating that the instrument has been provided by a user to a recipient. The set of instructions, when executed by one or more processors of the device, may cause the device to determine a prediction of the time of the event associated with the instrument based on the recipient. The set of instructions, when executed by one or more processors of the device, may cause the device to perform one or more actions based on the prediction of the time of the event associated with the instrument.

DETAILED DESCRIPTION

Figure 1A:
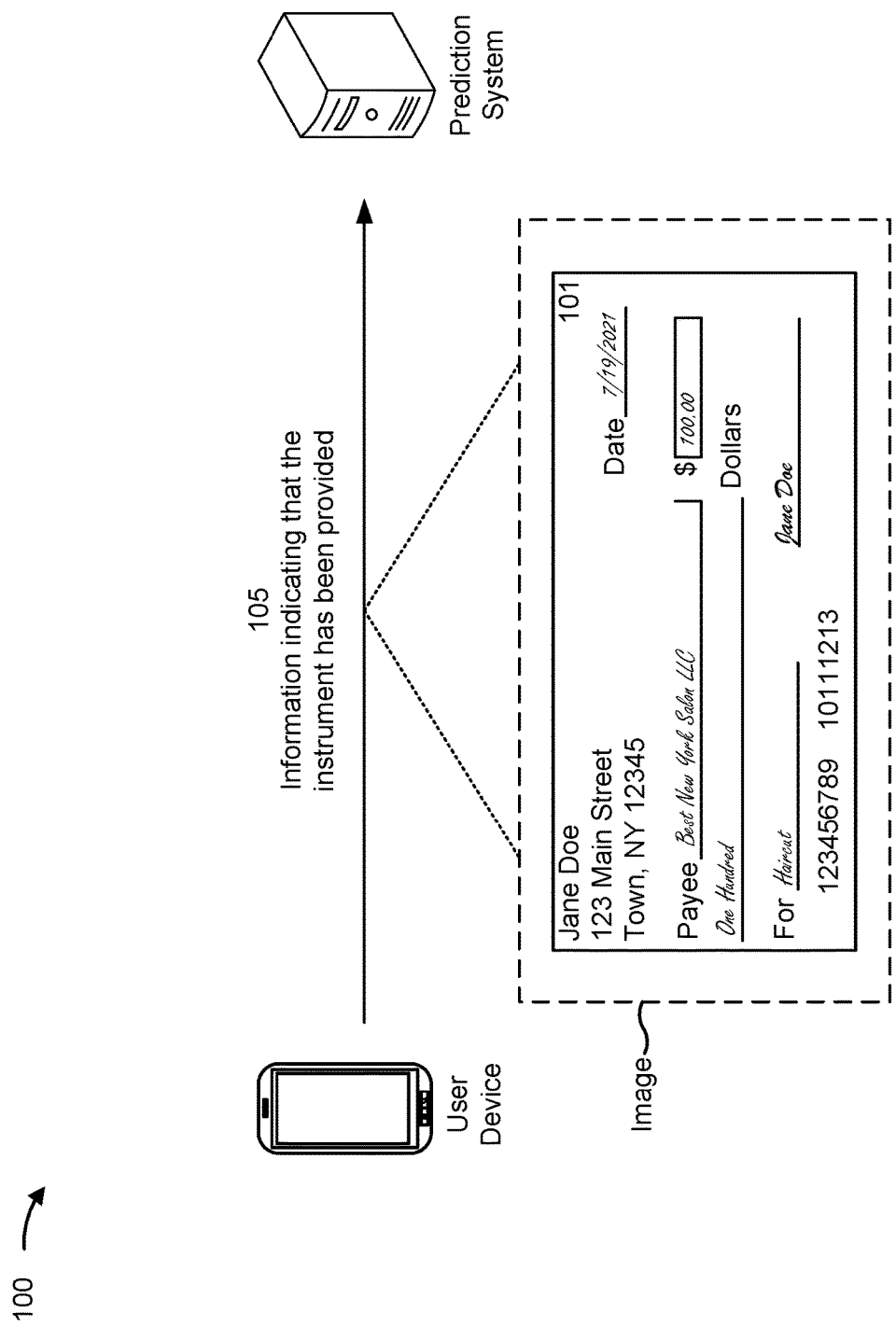
FIGS. 1A-1D are diagrams of an example implementation relating to predicting a time of an event associated with an instrument.

The following detailed description of example implementations refers to the accompanying drawings. The same reference numbers in different drawings may identify the same or similar elements.

An entity (e.g., a company, an organization, or an institution, among other examples) may maintain accounts for a plurality of users. In some examples, a user may perform transactions in connection with an account maintained by the entity. For example, the user may issue an instrument (e.g., a check), associated with a monetary value to a recipient, and the recipient may execute a transaction with the instrument (e.g., deposit or cash the instrument) resulting in a reduction of a balance of the user's account. Sometimes an event associated with the instrument (e.g., a depositing event, a cashing event, a balance reduction event, or the like) may be significantly delayed (e.g., by days, weeks, or months) relative to a time when the user issued the instrument.

In some cases, the account may have sufficient funds to execute the transaction associated with the instrument at the time when the user issued the instrument, but the account may have insufficient funds to successfully execute the transaction after weeks or months of delay. Accordingly, the transaction may result in an overdraft and/or may be declined (e.g., by the entity) when execution of the transaction is attempted (e.g., when depositing or cashing of the instrument by the recipient is attempted). Accordingly, the entity may consume computing resources (e.g., processing resources, memory resources, communication resources, and/or power resources, among other examples) associated with attempting to execute the transaction event, declining the transaction event (e.g., due to insufficient funds), updating a database to indicate that the transaction event was declined and/or that an overdraft occurred, notifying the user that the transaction event was declined and/or that an overdraft occurred, and/or providing instructions or other resources to the user on how to increase an availability of funds of the account, among other examples.

Some implementations described herein provide a prediction system that uses a machine learning model to identify information associated with an instrument that has been provided (e.g., issued) by a user to a recipient, and to generate a prediction of a time of an event associated with the instrument (e.g., a depositing event, a cashing event, a balance reduction event, or the like) based on the information. In some implementations, the prediction system may identify one or more characteristics associated with the recipient based on the information. For example, the prediction system may use natural language processing of the information, or another computational linguistics technique, to determine an entity category to which the recipient belongs, demographic information associated with the recipient, or financial information associated with the recipient. The prediction system may use the characteristics to generate the prediction of the time of the event associated with the instrument. Based on the prediction, the prediction system may determine whether a balance of an account of the user will reach a threshold as a result of the event. Moreover (e.g., if the balance of the account is to reach the threshold), the prediction system may transmit a notification to a user device of the user that indicates the prediction, may cause a transfer of funds to the account, may cause a hold on funds of the account, or the like.

In this way, the prediction system facilitates an increase to, or a maintenance of, the balance of the account. This may increase a likelihood that the account has sufficient funds to successfully execute a transaction associated with the instrument at the predicted time of the event associated with the instrument. Accordingly, the prediction system reduces consumption of computing resources (e.g., processing resources, memory resources, communication resources, and/or power resources, among other examples) used to attempt to execute a transaction (e.g., that may be declined), to decline the transaction, to update a database to indicate that the transaction was declined and/or that an overdraft occurred, to notify the user that the transaction was declined and/or that an overdraft occurred, and/or to provide instructions or other resources to the user on how to increase an availability of funds of the account, among other examples.

Further, the prediction system is able to provide the same functionality for multiple accounts (e.g., thousands, tens of thousands, hundreds of thousands, or millions of accounts) of an entity. Accordingly, the prediction system transmits proactive notifications, based on machine learning model predictions, that enable multiple actions (e.g., for thousands, tens of thousands, hundreds of thousands, or millions of accounts) to be proactively performed that would not otherwise be proactively performed. This reduces a likelihood that the multiple accounts will encounter declined transactions, and therefore consumption of computing resources associated with facilitating transactions of the multiple accounts may be reduced.

FIGS. 1A-1D are diagrams of an example 100 associated with predicting a time of an event associated with an instrument. As shown in FIGS. 1A-1D, example 100 includes a prediction system and a user device. These devices are described in more detail in connection with FIGS. 3 and 4. The prediction system may be associated with an entity (e.g., a financial institution) that maintains accounts for a plurality of users. The user device may be associated with a user that is associated with an account maintained by the entity.

In some implementations, the prediction system may include, or may be in communication with, a historical event database that may store historical data. The historical data may include one or more entries respectively associated with one or more historical events. A historical event may relate to a transaction involving an instrument. The historical data may indicate time durations between provisions of instruments to recipients and respective events (e.g., transaction events) associated with the instruments. For example, an entry of the historical data may indicate an identity (e.g., a name, a unique identifier, or the like) of a user that issued the instrument, a location (e.g., a state, a city, an address, or the like) of the user, a value (e.g., a monetary value) of the instrument, a transaction type associated with the instrument (e.g., a transaction for services, a transaction for goods, a transaction for paying a bill, a gift transaction, or the like), a time (e.g., a date) that the instrument was issued, an identity (e.g., a name, a unique identifier, or the like) of a recipient of the instrument, a location (e.g., a state, a city, an address, or the like) of the recipient, a time (e.g., a date) of an event (e.g., a transaction event) associated with the instrument (e.g., a depositing event, a cashing event, and/or an account balance reduction event), a category associated with the recipient, demographic information associated with the recipient, behavioral information associated with the recipient (e.g., whether the recipient uses mobile banking or in-person banking, whether the recipient uses a teller, an automated teller machine (ATM), or a mobile deposit application to deposit instruments, or the like), a type of the recipient (e.g., business or individual), and/or a relationship type between the user and the recipient, among other examples.

The prediction system, or another device, may obtain historical data from instrument image data. The instrument image data may include one or more images of instruments that were involved in transactions. For example, in connection with an event (e.g., a depositing event or a cashing event) associated with an instrument, the prediction system, or another device, may obtain an image of the instrument. The prediction system, or another device, may perform processing of the instrument image data to obtain the historical data. For example, performing processing of the instrument image data may include performing optical character recognition (OCR) on one or more images of the instrument image data to extract information from the one or more images. The information of an instrument may include a name and an address of an issuer of the instrument, a name of a recipient of the instrument, a value of the instrument, an annotation on the instrument, and/or a date the instrument was issued, among other examples. In some implementations, the prediction system, or another device, may determine labels (e.g., "issuer name," "recipient name," "date," "value," or the like) for information extracted from an image using a template matching technique, based on a proximity of particular information to particular keywords identified in the image, or the like.

In some implementations, the prediction system, or another device, may obtain historical data from other sources. For example, historical data may be obtained from metadata associated with the instrument image data, which may indicate a time an image was generated and/or a location or an address of a recipient of an instrument, among other examples. As another example, historical data may be obtained from account data associated with accounts maintained by the entity. The account data may indicate a time of an account balance reduction event associated with an instrument (e.g., a transaction date for the instrument), a time of a depositing event or a cashing event associated with an instrument (e.g., if a recipient of the instrument also has an account with the entity), and/or an address of a recipient of an instrument (e.g., if the recipient also has an account with the entity), among other examples. As another example, the prediction system, or another device, may determine a date that an instrument was issued by a user based on a pattern of previous behavior of the user. For example, the pattern of previous behavior may indicate a day of the week that the user issues instruments, a day of the month that the user issues instruments, or the like.

In some implementations, the prediction system may communicate with the historical event database to access and/or to obtain the historical data. In some implementations, the prediction system may train a machine learning model (or may obtain a trained machine learning model) to determine a prediction of a time (e.g., a future date or a quantity of days) of an event associated with an instrument (e.g., a depositing event, a cashing event, and/or an account balance reduction event). The prediction system may train the machine learning model based on the historical data. In some implementations, the prediction system may train the machine learning model based on information included in the one or more entries (e.g., that are respectively associated with one or more events) of the historical data. In some implementations, the machine learning model may be trained and/or used in a manner similar to that described with respect to FIG. 2.

As shown in FIG. 1A, and by reference number 105, the prediction system may receive information indicating that an instrument (e.g., a check) has been provided (e.g., issued) by a user to a recipient. For example, the prediction system may receive the information from the user device of the user. The user may provide the instrument to the recipient by giving the instrument to the recipient, placing the instrument in the mail for the recipient, drafting the instrument for the recipient, requesting (e.g., via an electronic payment service) that an instrument be provided to the recipient, or the like. Thus, the information may indicate that the instrument has been provided by the user even if the user intends to provide the instrument but has not yet done so. The instrument may be associated with a value (e.g., a monetary value payable to the recipient). Moreover, the instrument may be designated for (e.g., indicated for or payable to) the recipient. Additionally, the instrument may be associated with the user's account (e.g., payable from the user's account). The information may identify the recipient, the value, and/or a time (e.g., a date) when the instrument was provided by the user, among other examples.

In some implementations, the information may include form data input, via the user device, by the user. For example, in connection with issuing an instrument, the user may submit, via the user device, a form that includes the form data. That is, the prediction system may receive the form data from the user device. The form data may indicate an identity of the user, a location of the user, a value of the instrument, a type of transaction associated with the instrument, a time (e.g., a date) that the instrument was issued, an identity of a recipient of the instrument, a location of the recipient, a category associated with the recipient (e.g., "salon," "landlord," "utility provider," or the like), demographic information associated with the recipient (e.g., an age of the recipient, a gender of the recipient, an occupation of the recipient, or the like), and/or a relationship between the user and the recipient (e.g., a family relationship, a co-worker relationship, a business relationship, or the like), among other examples. Additionally, or alternatively, the information may include an image of the instrument. For example, the user device (e.g., using a camera of the user device) may capture, or otherwise obtain, the image of the instrument, and the user device may transmit the image to the prediction system.

Figure 1B:
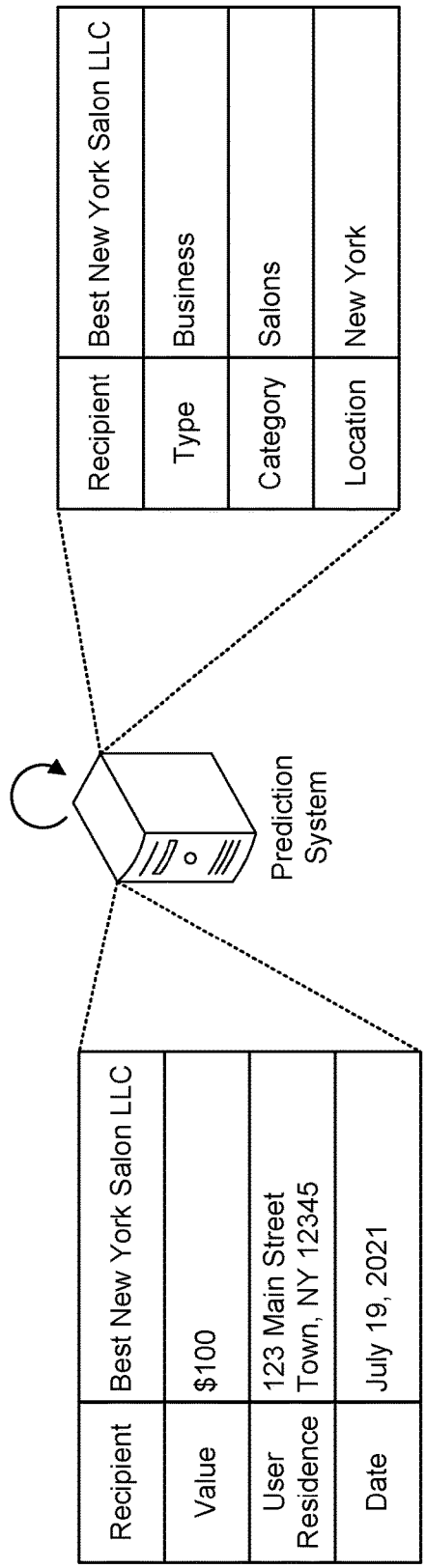

As shown in FIG. 1B, and by reference number 110, the prediction system may identify information associated with the instrument. The prediction system may identify the information associated with the instrument based on the form data received from the user device. Additionally, or alternatively, the prediction system may identify the information associated with the instrument by processing the image of the instrument received from the user device. For example, the prediction system may perform OCR of the image to extract the instrument data from the image. The instrument data may include a name of the user, a name of the recipient, an address of the user, a date associated with provision of the instrument (e.g., a date when the instrument was drafted or issued), a value of the instrument, and/or an annotation of the instrument (e.g., indicating a purpose for the instrument), among other examples. In some implementations, the prediction system may determine labels for the instrument data extracted from the image, in a similar manner as described above.

As shown by reference number 115, the prediction system may identify one or more characteristics associated with the recipient of the instrument. Additionally, or alternatively, the prediction system may identify a transaction type associated with the instrument. For example, the prediction system may identify the one or more characteristics and/or the transaction type based on the information associated with the instrument. In some implementations, a characteristic associated with the recipient may be a name of the recipient (e.g., which may be used to identify one or more previous instrument transactions involving the recipient). In some implementations, a characteristic associated with the recipient may be a category associated with the recipient, demographic information associated with the recipient, and/or behavioral information associated with the recipient, among other examples. The prediction system may identify the one or more characteristics based on the form data, the information associated with the instrument, and/or other data, such as account data. For example, if the recipient also has an account with the entity, the prediction system may use the account data to identify the behavioral information; account information, such as a balance of the recipient's account and/or financial products used by the recipient; and/or demographic information, such as an occupation of the recipient and/or an employer of the recipient.

In some implementations, the prediction system may process the information associated with the instrument to identify the one or more characteristics and/or the transaction type. In some implementations, the prediction system may process the name of the recipient and/or an annotation of the instrument to identify the one or more characteristics and/or the transaction type. For example, the prediction system may perform natural language processing, or use another computational linguistics technique, of the name of the recipient and/or the annotation to identify the one or more characteristics and/or the transaction type.

In some cases, the name of the recipient and/or the annotation may indicate a type of the recipient, a category associated with the recipient, demographic information associated with the recipient, and/or the transaction type. For example, if the name of the recipient is "Best New York Salon LLC," then the prediction system may process the name to determine that the recipient type is a business, that a category associated with the recipient is "salon," and/or that a location of the recipient is "New York." As another example, if the annotation is "fall semester tuition," then the prediction system may process the annotation to determine that a category associated with the recipient is "school." As another example, if the annotation is "sink installation," then the prediction system may process the annotation to determine that a category associated with the recipient is "plumber," that a relationship between the user and the recipient is a service provider-customer relationship, and/or that a transaction type associated with the instrument is a transaction for services. Furthermore, the prediction system may process the name of the recipient to determine an age associated with the recipient (e.g., based on the name of the recipient using a database that includes historical merchant information), a recipient type of the recipient (e.g., using a machine learning model trained to determine a likelihood that the name is a business or an individual), or the like.

Figure 1C:
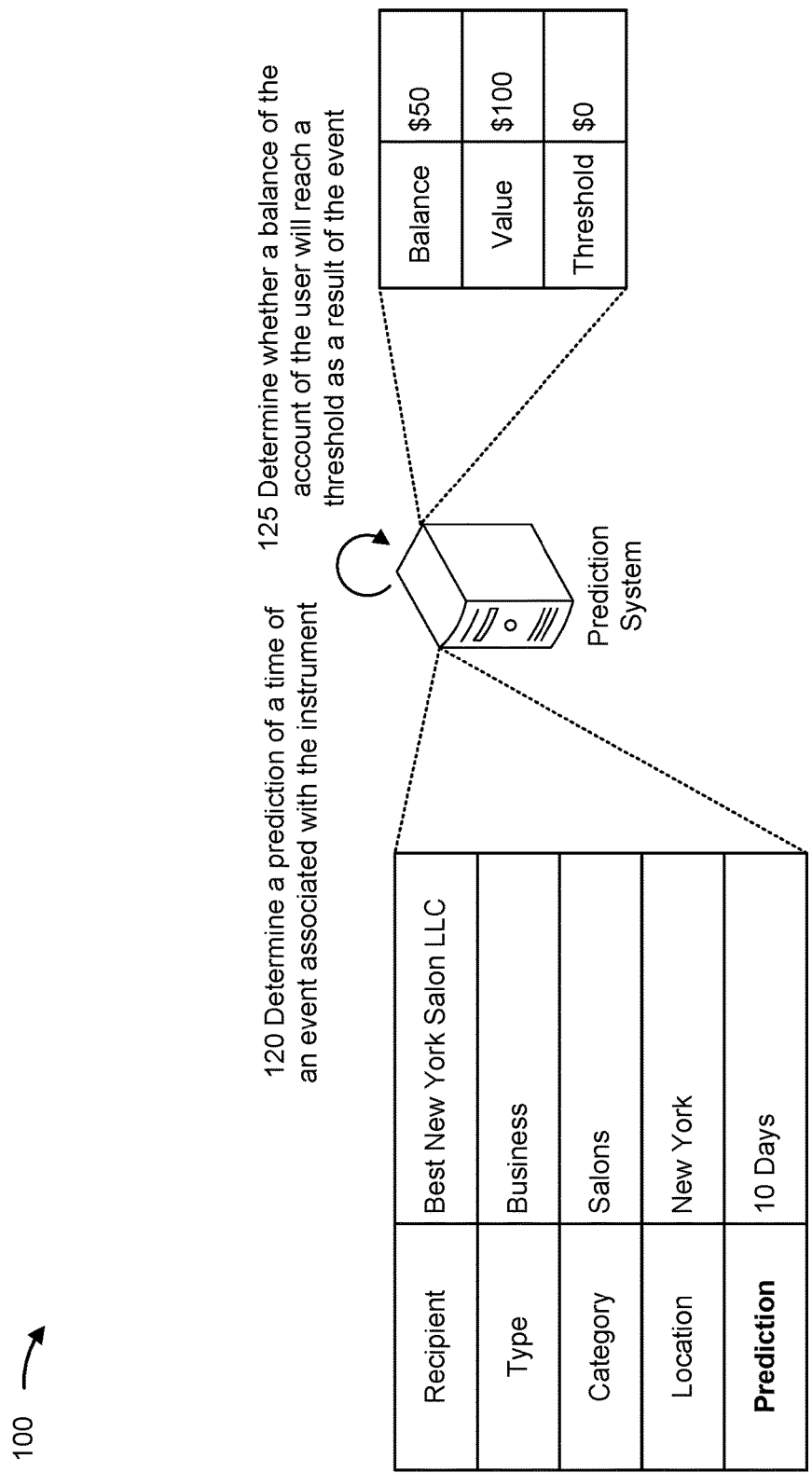

As shown in FIG. 1C, and by reference number 120, the prediction system may determine a prediction of a time (e.g., a delay expressed as a future date or a quantity of days) of an event associated with the instrument. The event associated with the instrument may be a transaction event, or another type of event, that will result in a reduction of a balance of the user's account. For example, the event associated with the instrument may be a depositing event (e.g., depositing of the instrument by the recipient), a cashing event (e.g., cashing of the instrument by the recipient), and/or an account balance reduction (or posting) event (e.g., a reduction of the balance of the user's account based on the recipient depositing or cashing the instrument), among other examples.

The prediction system may determine the prediction of the time of the event using the machine learning model trained to determine a prediction of a time of an event associated with an instrument, as described above. For example, the machine learning model may be trained to output the prediction of the time of the event based on an input of information associated with the recipient and/or information associated with the instrument. In some implementations, the machine learning model may determine the prediction of the time of the event based on a feature set that includes a name of the recipient, a category associated with the recipient, demographic information associated with the recipient, behavioral information associated with the recipient, the value, and/or the transaction type associated with the instrument, in a similar manner as described with respect to FIG. 2. In some implementations, the machine learning model may be specific to the recipient (e.g., if the recipient is a high volume recipient, such as a cable company, a power company, a government agency, or the like).

The prediction system may determine the prediction of the time of the event (e.g., using the machine learning model) based on the information associated with the instrument and/or the one or more characteristics identified for the recipient. For example, the prediction of the time of the event may be based on time durations (e.g., between issuance of instruments and respective events associated with the instruments) associated with historical events as indicated by the historical data. In particular, the prediction of the time of the event may be based on time durations associated with historical events involving the recipient, involving one or more other recipients associated with characteristics that are the same as or similar to the one or more characteristics identified for the recipient (e.g., one or more other recipients that are associated with a same or similar category, demographic information, behavioral information, and/or account information, as the recipient), involving instrument values that are the same as or similar to the value of the instrument (e.g., instruments associated with a particular value range may be acted upon faster than instruments associated with another value range), and/or involving transaction types that are the same as or similar to the transaction type associated with the instrument (e.g., instruments associated with a particular transaction type may be acted upon faster than instruments associated with another transaction type).

In some implementations, the prediction system may determine the prediction of the time of the event further based on a transit time estimate for the instrument (e.g., if a first location associated with the user and a second location associated with the recipient are separated by a threshold distance, such as 50 miles or 100 miles). The prediction system may determine (e.g., estimate) the transit time based on the first location (e.g., an address, a zip code, a city, a geographic area, or the like) associated with the user and the second location associated with the recipient. The prediction system may identify the first location of the user from the information associated with the instrument (e.g., the form data and/or the instrument data extracted from the image of the instrument) and/or from account information for the user. The prediction system may identify the second location of the recipient from the information associated with the instrument (e.g., the form data), from the one or more characteristics identified for the recipient (e.g., a location determined for the recipient based on processing of the name of the recipient), and/or from account information for the recipient (e.g., if the recipient also has an account with the entity). In some cases, the prediction system may identify the second location from a data structure (e.g., a database) that includes location information (e.g., address information) for particular recipients (e.g., high volume recipients).

In some implementations, the machine learning model may determine the prediction of the time of the event further based on the first location associated with the user and the second location associated with the recipient (e.g., the prediction of the time of the event determined by the machine learning model may account for the transit time). In some implementations, the prediction system may determine the transit time based on the first location and the second location using a different machine learning model or algorithm. Here, the prediction system may adjust the prediction of the time of the event by the transit time.

In some implementations, the prediction system may perform an adjustment of the prediction of the time of the event (e.g., a prediction of a quantity of days) to reduce the prediction of the time of the event. For example, if the prediction of the time of the event is 10 days, the prediction system may adjust the prediction to a lesser quantity of days, such as 7 days or 5 days. The prediction of the time of the event may be reduced to obtain a more conservative prediction, which may improve a likelihood that a transaction involving the instrument will be successful (e.g., the user's account will have sufficient funds at the actual time of the event). In some implementations, an amount of the adjustment may be based on the value of the instrument (e.g., the amount of the adjustment may be greater for a greater value and smaller for a smaller value) and/or a balance of the user's account.

As shown by reference number 125, the prediction system may determine whether a balance of the account of the user will reach a threshold as a result of the event associated with the instrument. That is, the prediction system may determine whether the balance of the user's account will reach the threshold based on the prediction of the time of the event and/or the value of the instrument. The threshold may be a balance greater than zero (e.g., 100 dollars), a balance of zero (e.g., 0 dollars), or a balance less than zero (e.g., −0.01 dollars, thereby indicating a potential overdraft). The prediction system may receive, from the user device, an indication of a user-defined value for the threshold. In some implementations, the prediction system may determine whether the balance of the user's account will reach the threshold based on the adjusted prediction (e.g., the prediction is adjusted prior to the prediction system determining whether the balance will reach the threshold), as described above.

In some implementations, determining whether the balance of the user's account will reach the threshold may be based on a plurality of predictions and/or instrument values for a plurality of instruments issued by the user. In some implementations, determining whether the balance of the user's account will reach the threshold may be based on an estimate of a future balance of the user's account at the predicted time of the event (e.g., based on an estimate of a timing and/or amounts of inflows to and/or outflows from the user's account). For example, if the value of the instrument is $500, the predicted time of the event is 10 days, and the balance of the user's account is estimated to be $400 in 10 days, then the prediction system may determine that the balance of the user's account will reach the threshold (e.g., −0.01 dollars) at the predicted time of the event.

The prediction system may determine the estimate of the future balance based on historical account data associated with the user's account. For example, the historical account data may indicate fluctuations to the balance of the user's account over time, such as the balance increasing by a particular amount on a particular day each month (e.g., a paycheck is deposited to the user's account on the first day of each month) and/or the balance decreasing by a particular amount on a particular day each month (e.g., a credit card bill is paid from the user's account on the tenth day of each month). In some implementations, the prediction system, or another device, may train a machine learning model, based on the historical account data, to determine an estimate of a future balance of the user's account. Accordingly, the prediction system may determine the estimate of the future balance of the user's account using the machine learning model.

Based on a determination that the balance of the user's account will reach the threshold, the prediction system may perform one or more actions, as described below. For example, the one or more actions may improve a likelihood that a transaction involving the instrument will be successful (e.g., the user's account will have sufficient funds at the actual time of the event). In some implementations, the prediction system may perform the one or more actions without making a determination of whether the balance of the user's account will reach the threshold. For example, the prediction system may perform the one or more actions based on determining the prediction of the time of the event.

Figure 1D:
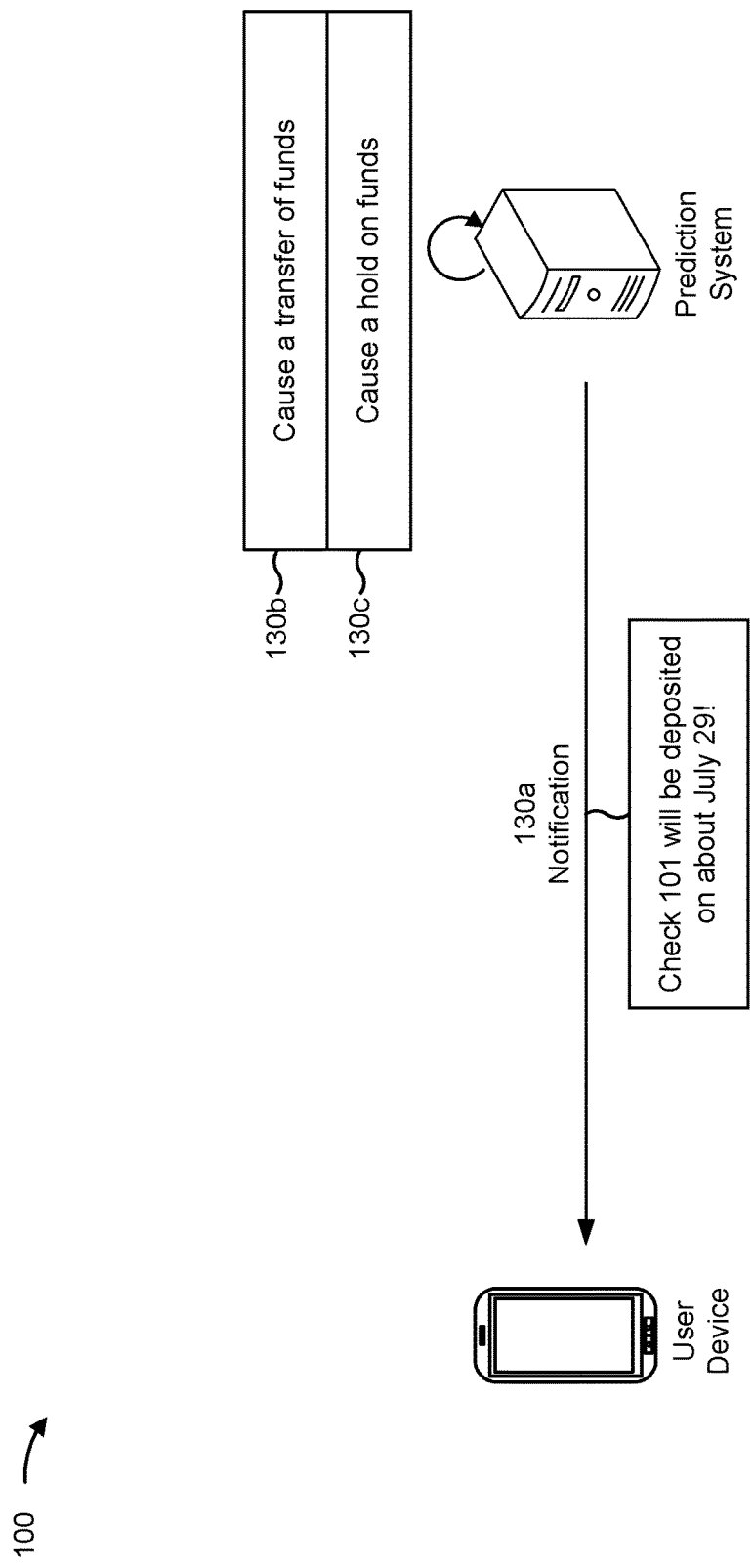

As shown in FIG. 1D, and by reference number 130a, the prediction system may transmit a notification to the user device. The notification may indicate the prediction of the time of the event and/or the adjusted prediction of the time of the event to provide a more conservative prediction. In some implementations, based on a determination that the balance of the user's account will reach the threshold as a result of the event, the notification may indicate that the balance of the user's account will reach the threshold in addition to, or alternatively to, indicating the prediction of the time of the event. In this way, the notification facilitates an increase to, or a maintenance of, the balance of the user's account at a sufficient level prior to the actual time of the event.

In some implementations, the notification may include information for presentation of an input element, to be presented by the user device, that enables a transfer of funds (e.g., an amount of funds that is based on the value of the instrument and/or the balance of the account) to the user's account. Additionally, or alternatively, the notification may include information for presentation of an input element, to be presented by the user device, that enables enrollment of the user's account with an overdraft protection service.

In some implementations, the prediction system may monitor the user's account (e.g., continuously until the event associated with the instrument has occurred) to determine whether to transmit the notification and/or one or more additional notifications. For example, the prediction system may monitor the balance of the user's account and/or transactions posted to the user's account (e.g., to identify whether the event associated with the instrument has occurred). The prediction system may transmit the notification and/or one or more additional notifications based on a determination that the event associated with the instrument has not occurred and/or based on a determination that the balance of the user's account will reach the threshold as a result of the event (e.g., if that was not the case previously).

As shown by reference number 130b, the prediction system may cause (e.g., request, initiate, or perform) a transfer of funds to increase the balance of the user's account. The prediction system may cause the transfer of funds based on a determination that the balance of the user's account will reach the threshold as a result of the event. An amount of the transfer of funds may be based on the value of the instrument, the prediction of the time of the event, and/or the estimate of the future balance of the account.

As shown by reference number 130c, the prediction system may cause (e.g., request, initiate, or perform) a hold on funds of the user's account. The prediction system may cause the hold on the funds based on a determination that the balance of the user's account will reach the threshold as a result of the event. An amount of the hold on the funds may be based on the value of the instrument, the prediction of the time of the event, and/or the estimate of the future balance of the account. The hold on the funds may prevent the user from accessing the funds, or the hold on the funds may trigger a notification to the user (e.g., on the user device, on a display of an ATM, or the like) if the user attempts to access the funds.

In this way, the prediction system facilitates an increase to, or a maintenance of, the balance of the user's account, thereby increasing a likelihood that the account has sufficient funds to successfully execute a transaction associated with the instrument at the predicted time of the event. Accordingly, the prediction system reduces consumption of computing resources used to attempt to execute a transaction (e.g., that is likely to be declined), to decline the transaction, to update a database to indicate that the transaction was declined, to notify the user that the transaction was declined, and/or to provide instructions or other resources to the user on how to increase an availability of funds of the account, among other examples.

As indicated above, FIGS. 1A-1D are provided as an example. Other examples may differ from what is described with regard to FIGS. 1A-1D.

Figure 2:
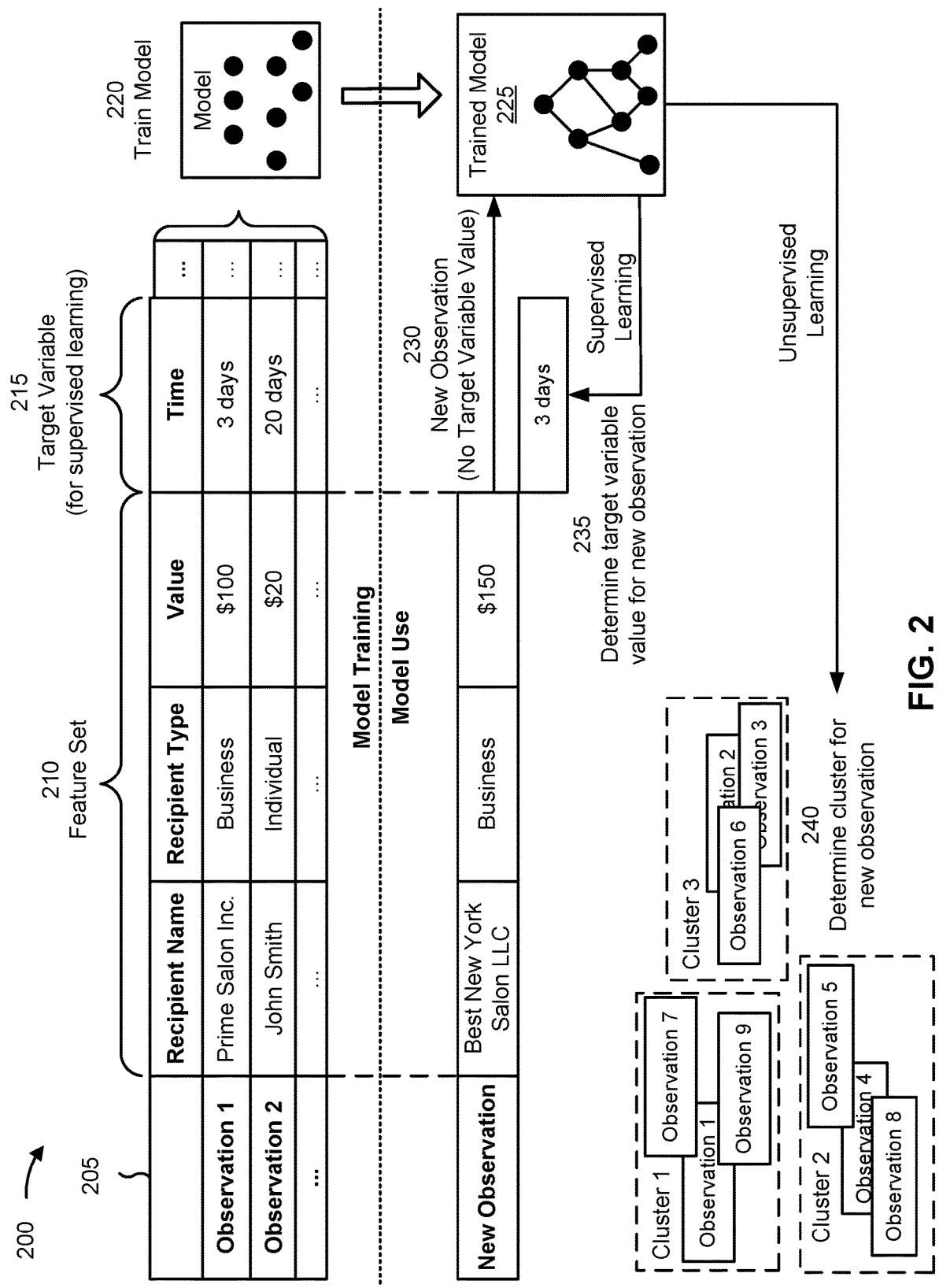
FIG. 2 is a diagram illustrating an example of training and using a machine learning model in connection with predicting a time of an event associated with an instrument.

FIG. 2 is a diagram illustrating an example 200 of training and using a machine learning model in connection with predicting a time of an event associated with an instrument. The machine learning model training and usage described herein may be performed using a machine learning system. The machine learning system may include or may be included in a computing device, a server, a cloud computing environment, or the like, such as the prediction system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the historical event database, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the historical event database and/or the prediction system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of recipient name, a second feature of recipient type, a third feature of value (e.g., of an instrument), and so on. As shown, for a first observation, the first feature may have a value of "Prime Salon Inc.", the second feature may have a value of "Business", the third feature may have a value of "$100," and so on. These features and feature values are provided as examples, and these feature and feature values may differ in other examples. For example, the feature set may include one or more of the following features: a name of a recipient, a category associated with a recipient, a type of a recipient (e.g., business, individual, charity, or the like), a location of a recipient, demographic information associated with a recipient (e.g., an age, a gender, an occupation, or the like), behavioral information associated with a recipient (e.g., whether a recipient uses a teller, an ATM, or a mobile deposit application to deposit instruments), a value of an instrument, a transaction type associated with an instrument, an event type associated with an instrument (e.g., depositing, cashing, or the like).

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is time, which has a value of three days for the first observation.

The feature set and target variable described above are provided as examples, and other examples may differ from what is described above. For example, for a target variable of a transmit time, as described above, the feature set may include a location of a user, a location of a recipient, and/or a distance between a location of a user and a location of a recipient.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of "Best New York Salon LLC," a second feature of "Business," a third feature of "$150," and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of three days for the target variable of time for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first automated action may include, for example, determining whether an account balance will reach a threshold, transmitting a notification, causing a transfer of funds, and/or causing a hold on funds, among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a highly likely prediction), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to predict a time of an event associated with an instrument. The machine learning system enables recognition and/or identification of tens, hundreds, thousands, or millions of features and/or feature values for tens, hundreds, thousands, or millions of observations, thereby increasing accuracy and consistency and reducing delay associated with predicting a time of an event associated with an instrument relative to requiring computing resources to be allocated for tens, hundreds, or thousands of operators to manually predict a time of an event associated with an instrument using the features or feature values.

As indicated above, FIG. 2 is provided as an example. Other examples may differ from what is described in connection with FIG. 2.

Figure 3:
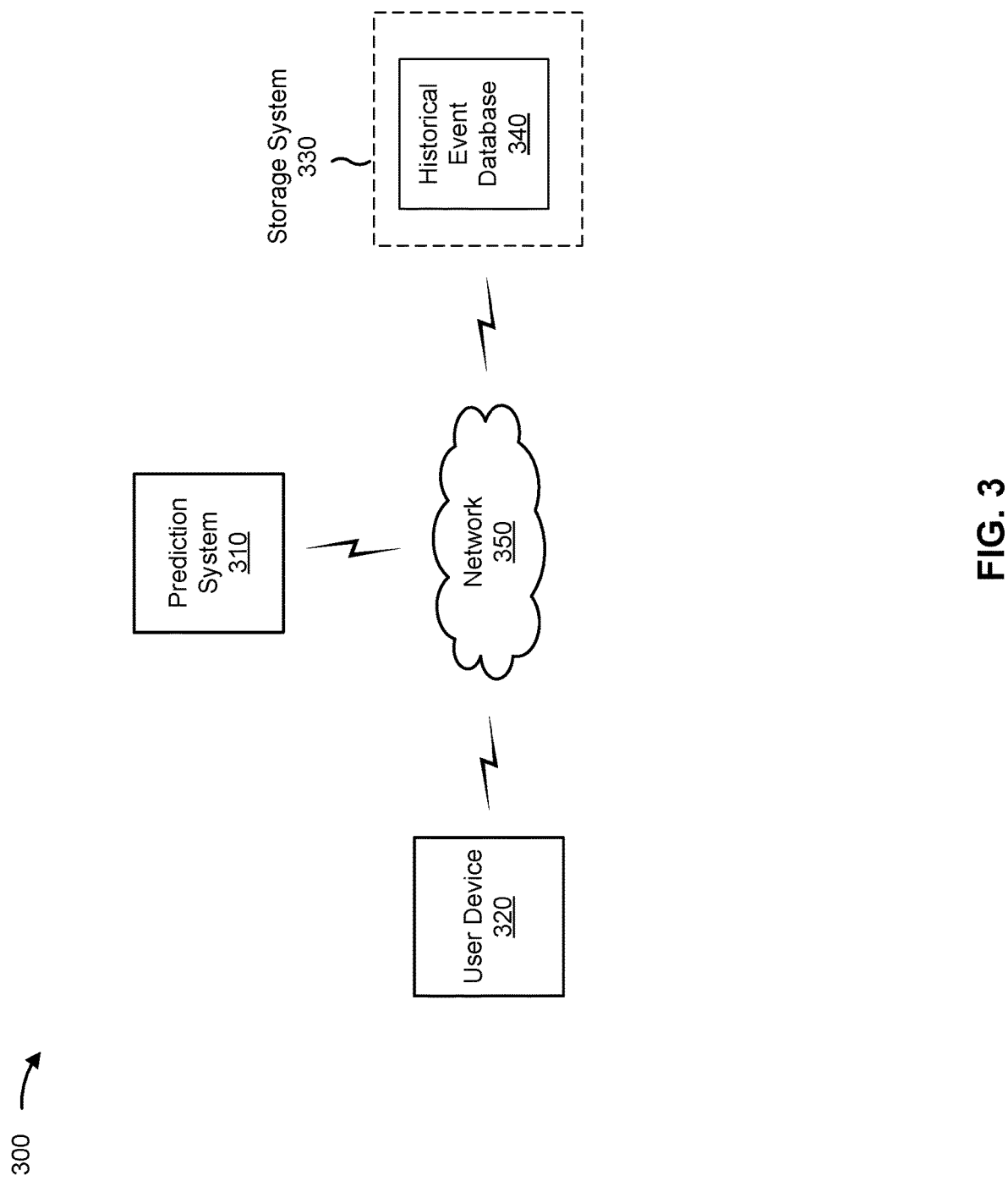
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a prediction system 310, a user device 320, a storage system 330 (e.g., that includes a historical event database 340), and a network 350. Devices of environment 300 may interconnect via wired connections, wireless connections, or a combination of wired and wireless connections.

The prediction system 310 includes one or more devices capable of receiving, generating, storing, processing, and/or providing information associated with predicting a time of an event associated with an instrument, as described elsewhere herein. The prediction system 310 may include a communication device and/or a computing device. For example, the prediction system 310 may include a server, an application server, a client server, a web server, a database server, a host server, a proxy server, a virtual server (e. g., executing on computing hardware), a device that includes computing hardware used in a cloud computing environment, or a similar type of device. The prediction system 310 may communicate with one or more other devices of environment 300, as described elsewhere herein.

The user device 320 includes one or more devices capable of receiving, generating, storing, processing, and/or providing information associated with predicting a time of an event associated with an instrument, as described elsewhere herein. The user device 320 may include a communication device and/or a computing device. For example, the user device 320 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 320 may communicate with one or more other devices of environment 300, as described elsewhere herein.

The storage system 330 includes one or more devices capable of receiving, generating, storing, processing, and/or providing information associated with predicting a time of an event associated with an instrument, as described elsewhere herein. The storage system 330 may include a communication device and/or a computing device. For example, the storage system 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the storage system 330 may include the historical event database 340. The storage system 330 may communicate with one or more other devices of environment 300, as described elsewhere herein.

The network 350 includes one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
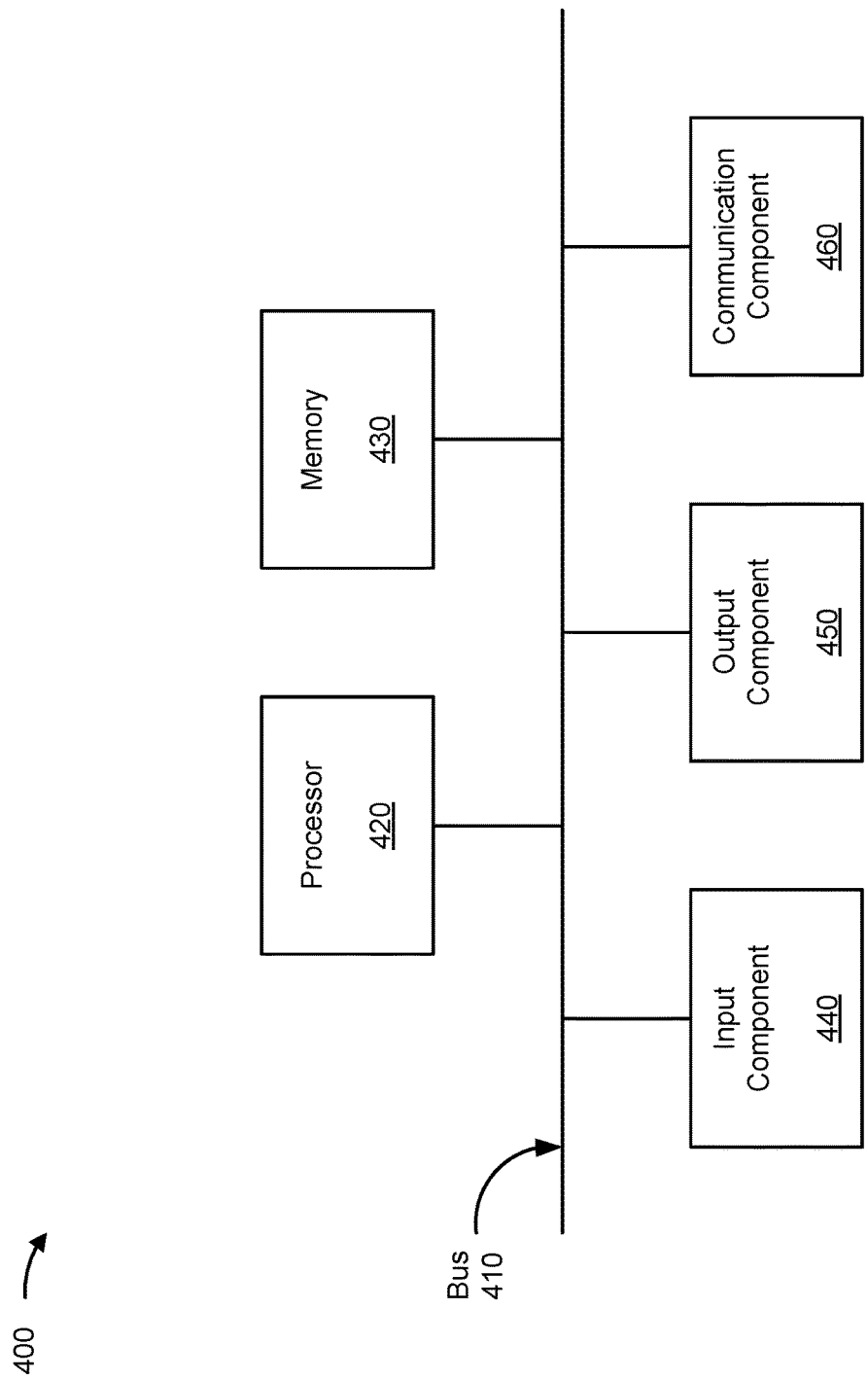
FIG. 4 is a diagram of example components of one or more devices of FIG. 3.

FIG. 4 is a diagram of example components of a device 400, which may correspond to the prediction system 310, the user device 320, and/or the storage system 330. In some implementations, the prediction system 310, the user device 320, and/or the storage system 330 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
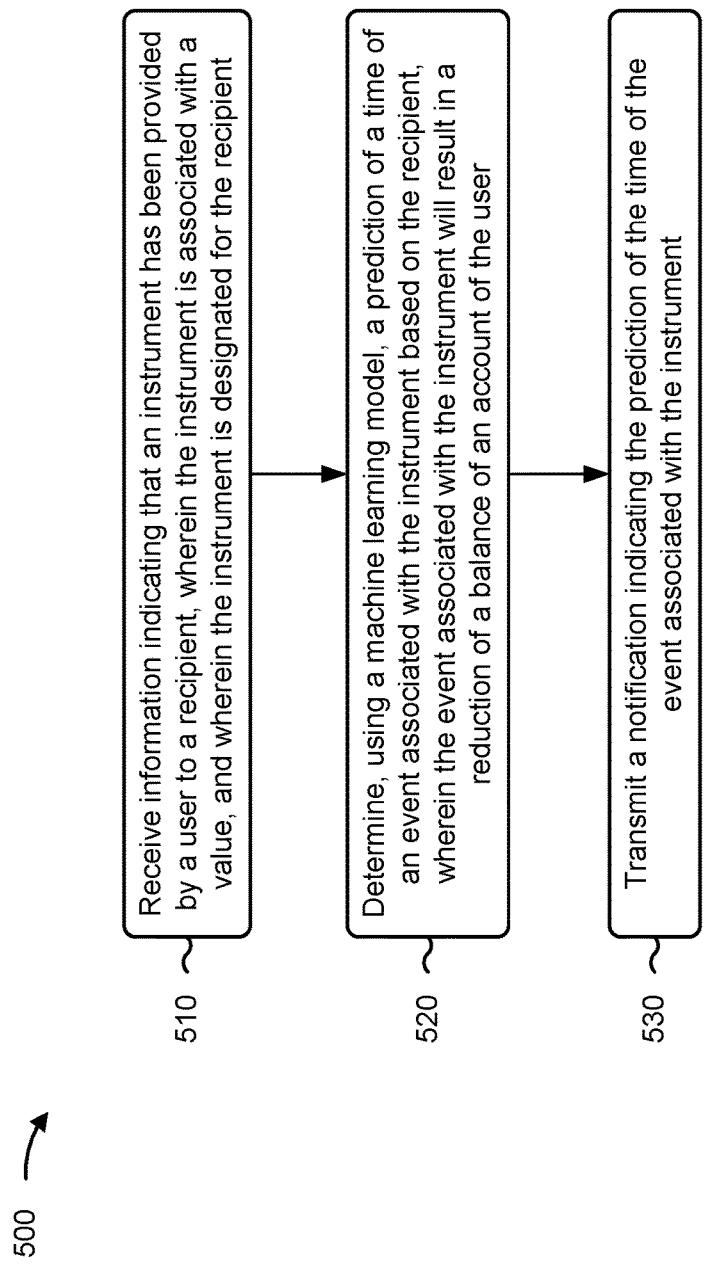
FIG. 5 is a flowchart of an example process relating to predicting a time of an event associated with an instrument.

FIG. 5 is a flowchart of an example process 500 associated with predicting a time of an event associated with an instrument. In some implementations, one or more process blocks of FIG. 5 may be performed by a device (e.g., prediction system 310). In some implementations, one or more process blocks of FIG. 5 may be performed by another device or a group of devices separate from or including the device, such as user device 320 and/or storage system 330. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving information indicating that an instrument has been provided by a user to a recipient, wherein the instrument is associated with a value, and wherein the instrument is designated for the recipient (block 510). As further shown in FIG. 5, process 500 may include determining, using a machine learning model, a prediction of a time of an event associated with the instrument based on the recipient, wherein the event associated with the instrument will result in a reduction of a balance of an account of the user (block 520). As further shown in FIG. 5, process 500 may include transmitting a notification indicating the prediction of the time of the event associated with the instrument (block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for predicting a time of an event associated with an instrument using a machine learning model, the system comprising:
one or more memories; and
one or more processors, communicatively coupled to the one or more memories, configured to:
train a neural network model using historical data associated with historical transaction events relating to transactions involving instruments, the historical data for each historical transaction event indicating at least:
a time duration between provisioning of a respective instrument to a respective recipient and a respective transaction event associated with the respective instrument, and
a transaction type associated with the respective instrument, wherein the neural network model is trained to output one or more predictions of times of transactions events associated with instruments based at least on a transaction type associated with an instrument;
receive information indicating that the instrument has been provided by a user to a recipient,
wherein the instrument is associated with a value, and
wherein the instrument is designated for the recipient;
process an annotation of the instrument to determine a relationship associated with the user and the recipient,
determine a transaction type associated with the instrument based on processing the relationship and the annotation;
identify one or more characteristics associated with the recipient,
determine, using the trained neural network model, a prediction of the time of the event associated with the instrument based on the one or more characteristics associated with the recipient and the determined transaction type associated with the instrument;
determine, based on the prediction of the time of the event and the value, whether a balance of an account of the user will reach a threshold as a result of the event associated with the instrument; and
transmit, to a device of the user, a notification based on a determination that the balance will reach the threshold as the result of the event associated with the instrument.

2. The system of claim 1, wherein the information identifies one or more of: the recipient, the value, or a time when the instrument was provided by the user.

3. The system of claim 1, wherein the one or more characteristics associated with the recipient used by the trained neural network model to determine the prediction of the time include one or more of: a category associated with the recipient, demographic information associated with the recipient, or behavioral information associated with the recipient.

4. The system of claim 1, wherein the one or more processors, to determine whether the balance of the account of the user will reach the threshold, are configured to:
determine an estimate of a future balance of the account of the user at the time; and
determine whether the balance of the account of the user will reach the threshold based on the estimate of the future balance of the account.

5. The system of claim 1, wherein the one or more processors are further configured to:
perform optical character recognition on instrument image data associated with the instruments to identify the historical data.

6. The system of claim 1, wherein the one or more processors are further configured to one or more of:
cause a transfer of funds, based on the value, to increase the balance of the account, or
cause a hold on funds of the account based on the value.

7. The system of claim 1, wherein the one or more processors, to identify the one or more characteristics of the recipient, are configured to:
perform natural language processing of a name of the recipient to identify the one or more characteristics.

8. The system of claim 1, wherein the historical data includes historical metadata associated with instrument image data.

9. A method of predicting a time of an event associated with an instrument using a machine learning model, comprising:
training, by a device, a neural network model using historical data associated with historical transaction events relating to transactions involving instruments, the historical data for each historical transaction event indicating at least:
a time duration between provisioning of a respective instrument to a respective recipient and a respective transaction event associated with the respective instrument, and
a transaction type associated with the respective instrument, wherein the neural network model is trained to output one or more predictions of times of transactions events associated with instruments based at least on a transaction type associated with an instrument;
receiving, by the device, information indicating that the instrument has been provided by a user to a recipient, wherein the instrument is associated with a value, and wherein the instrument is designated for the recipient;
processing, by the device, an annotation of the instrument to determine a relationship associated with the user and the recipient and to determine a transaction type associated with the instrument;
determining, by the device, using the trained neural network model, a prediction of the time of the event associated with the instrument based on the recipient and the determined transaction type associated with the instrument,
wherein the event associated with the instrument will result in a reduction of a balance of an account of the user; and
transmitting, by the device, to another device of the user, a notification indicating the prediction of the time of the event associated with the instrument.

10. The method of claim 9, further comprising:
causing a transfer of funds, based on the value, to increase the balance of the account, or
causing a hold on funds of the account based on the value.

11. The method of claim 9, wherein the trained neural network model determines the prediction of the time based on a feature set that includes one or more of: a name of the recipient, a category associated with the recipient, demographic information associated with the recipient, or behavioral information associated with the recipient, the value.

12. The method of claim 9, wherein the prediction of the time is further based on a transit time estimate for the instrument based on a first location associated with the user and a second location associated with the recipient.

13. The method of claim 9, wherein the event associated with the instrument is a cashing event or a depositing event.

14. The method of claim 9, wherein the information includes an image of the instrument.

15. A non-transitory computer-readable medium storing a set of instructions for predicting a time of an event associated with an instrument, the set of instructions comprising:
one or more instructions that, when executed by one or more processors of a device, cause the device to:
train a neural network model using historical data associated with historical transaction events relating to transactions involving instruments, the historical data for each historical transaction event indicating at least:
a time duration between provisioning of a respective instrument to a respective recipient and a respective transaction event associated with the respective instrument, and
a transaction type associated with the respective instrument, wherein the neural network model is trained to output one or more predictions of times of transactions events associated with instruments based at least on a transaction type associated with an instrument;
receive information indicating that the instrument has been provided by a user to a recipient,
wherein the instrument is associated with a value, and
wherein the instrument is designated for the recipient;
process an annotation of the instrument to determine a relationship associated with the user and the recipient and to determine a transaction type associated with the instrument;
determine, using the trained neural network model, a prediction of the time of the event associated with the instrument based on the recipient and the determined transaction type associated with the instrument,
wherein the event associated with the instrument will result in a reduction of a balance of an account of the user; and
perform one or more actions based on the prediction of the time of the event associated with the instrument.

16. The non-transitory computer-readable medium of claim 15, wherein the one or more instructions, that cause the device to perform the one or more actions, cause the device to:
transmit a notification to another device of the user,
cause a transfer of funds, based on the value, to increase the balance of the account, or
cause a hold on funds of the account based on the value.

17. The non-transitory computer-readable medium of claim 15, wherein the information includes an image of the instrument.

18. The non-transitory computer-readable medium of claim 17, wherein the one or more instructions, when executed by the one or more processors, further cause the device to:
perform optical character recognition of the image to identify one or more of: the recipient, the value, an address of the user, or a date associated with provision of the instrument.

19. The non-transitory computer-readable medium of claim 15, wherein the one or more instructions, when executed by the one or more processors, further cause the device to:
determine, based on the prediction of the time and the value, whether the balance will reach a threshold as a result of the event associated with the instrument; and
transmit, to another device of the user, a notification based on a determination that the balance will reach the threshold as the result of the event associated with the instrument.

20. The non-transitory computer-readable medium of claim 15, wherein the one or more instructions, that cause the device to perform the one or more actions, cause the device to perform an adjustment of the prediction of the time of the event.

* * * * *